March 9, 1937.  R. H. LAWSON ET AL  2,073,487
STOCKING AND METHOD OF MAKING THE SAME
Filed March 8, 1932  7 Sheets-Sheet 1

INVENTORS:
ROBERT H. LAWSON,
ARTHUR N. CLOUTIER,
By Roy F. Lovell
ATT'Y.

March 9, 1937. R. H. LAWSON ET AL 2,073,487
STOCKING AND METHOD OF MAKING THE SAME
Filed March 8, 1932 7 Sheets-Sheet 2

INVENTORS:
ROBERT H. LAWSON,
ARTHUR N. CLOUTIER
BY Roy F. Lovell,
ATT'Y.

March 9, 1937.  R. H. LAWSON ET AL  2,073,487
STOCKING AND METHOD OF MAKING THE SAME
Filed March 8, 1932   7 Sheets-Sheet 3

FIG. 8.
COURSES 10

FIG. 9.
COURSES 34.

FIG. 10.
COURSE 11

FIG. 11.
TO OPEN DIAL LATCHES

FIG. 20.

INVENTORS:
ROBERT H. LAWSON,
ARTHUR N. CLOUTIER,
BY Roy F. Lovell,
ATT'Y.

FIG. 12.
COURSE 42'

FIG. 13.
WELT 2

FIG. 14.
COURSE 43

FIG. 15.
COURSES 47-50

INVENTORS:
ROBERT H. LAWSON,
ARTHUR N. CLOUTIER,
By Roy F. Lovell,
ATT'Y.

March 9, 1937. R. H. LAWSON ET AL 2,073,487
STOCKING AND METHOD OF MAKING THE SAME
Filed March 8, 1932 7 Sheets-Sheet 5

INVENTORS:
ROBERT H. LAWSON,
ARTHUR N. CLOUTIER,
BY Roy F. Lovell
ATT'Y.

March 9, 1937.   R. H. LAWSON ET AL   2,073,487
STOCKING AND METHOD OF MAKING THE SAME
Filed March 8, 1932   7 Sheets-Sheet 6

INVENTORS:
ROBERT H. LAWSON,
ARTHUR N. CLOUTIER,
BY Roy F. Lovell,
ATT'Y.

March 9, 1937. R. H. LAWSON ET AL 2,073,487
STOCKING AND METHOD OF MAKING THE SAME
Filed March 8, 1932 7 Sheets-Sheet 7

INVENTORS:
ROBERT H. LAWSON,
ARTHUR N. CLOUTIER,
BY Roy F. Lovell,
ATT'Y.

Patented Mar. 9, 1937

2,073,487

UNITED STATES PATENT OFFICE 2,073,487

STOCKING AND METHOD OF MAKING THE SAME

Robert H. Lawson, Pawtucket, and Arthur N. Cloutier, Lonsdale, R. I., assignors to Hemphill Company, Central Falls, R. I., a corporation of Massachusetts Application March 8, 1932, Serial No. 597,528

16 Claims. (Cl. 66—173)

This invention relates to a stocking or half hose and to methods of knitting the same, and specifically to such a stocking or half hose wherein the knitting is begun at the top, such top consisting of alternating rib and plain wales and the leg consisting of plain wales; although, the knitting of the stocking may begin at the toe. Furthermore, while herein disclosed as pertaining to the knitting of a stocking or half hose, the invention in its broader aspects is applicable to the knitting of so-called body fabric having adjacent plain and rib courses.

Figures 1, 3, 4, 5, 6:
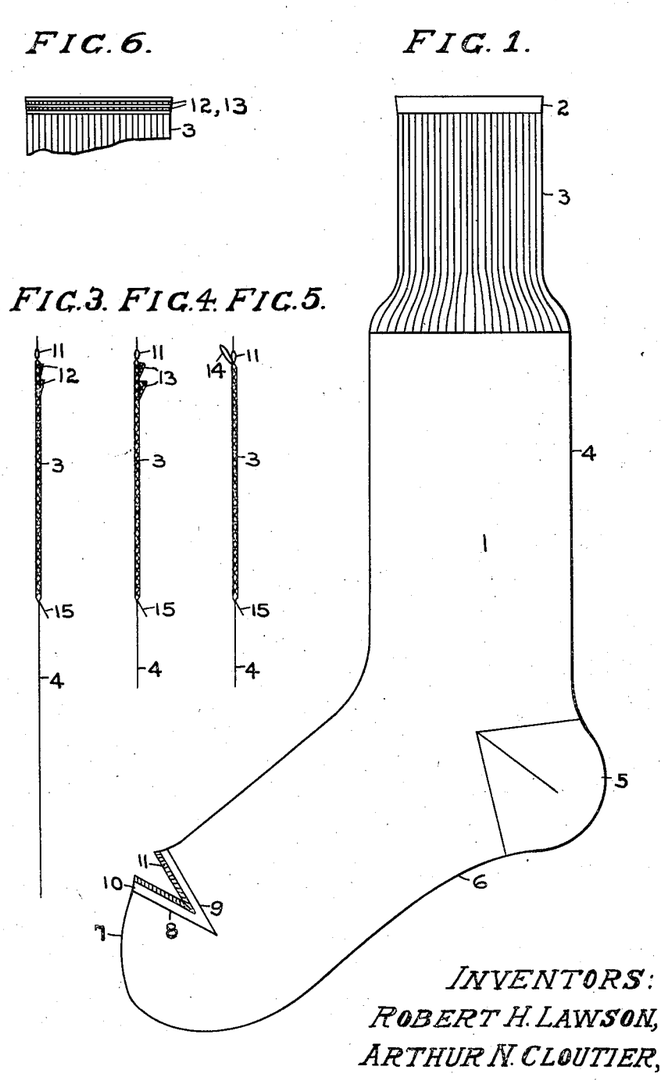
Fig. 1 is a diagrammatic view showing a stocking or half hose knitted in accordance with the means and methods hereinafter to be disclosed.
Fig. 3 is a view similar to Fig. 2 but showing tuck welts in place of the French welt.
Fig. 4 is another view similar to Fig. 2 but showing so-called half round welts in place of the French welt.
Fig. 5 is still another view similar to Fig. 2 but showing a turned welt in place of the French welt.
Fig. 6 is a fragmentary view of the top of a stocking and corresponding to the diagrammatic showing in either Fig. 3 or Fig. 4.
Figure 2:
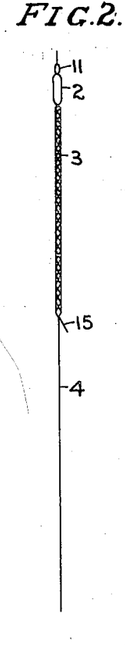
Fig. 2 is a more or less diagrammatic view showing an edge or section of one embodiment of the fabric, and wherein a French welt is incorporated in the top thereof.

Referring specifically to Figs. 1 and 2, the stocking therein shown which is indicated generally by the numeral 1, may be provided with a French welt 2, a one and one or other rib top 3, a plain leg 4, a heel 5, a foot 6 and a toe 7. In Fig. 1 a stocking is shown prior to the toe closing, i. e., before the stocking toe has been looped on a suitable machine which sews together the upper halves of the stocking along the lines 8 and 9. A few waste courses or so-called loopers rounds 10 are integrally connected, during the knitting, to the French welt 2 of the next stocking as by means of a pull course 11.

In Fig. 3 there is shown a fabric structure modified somewhat as compared with that shown in Fig. 2, a series of tuck welts 12 being substituted for the French welt 2, Fig. 2, such tuck welts being also indicated in Fig. 6.

In Fig. 4 there is shown another modification wherein half-round welts 13 are substituted for the tuck welts, Fig. 3.

Still another modified fabric structure is shown in Fig. 5, wherein a turned welt 14 is substituted for the welt shown in Figs. 2, 3 and 4.

In each of Figs. 2–5 inclusive there is shown a tab or extension 15, the courses of which act as ravel courses, especially when knitting is begun at the top of the stocking and a transfer is effected from rib to plain stitches.

Figures 7, 7A:
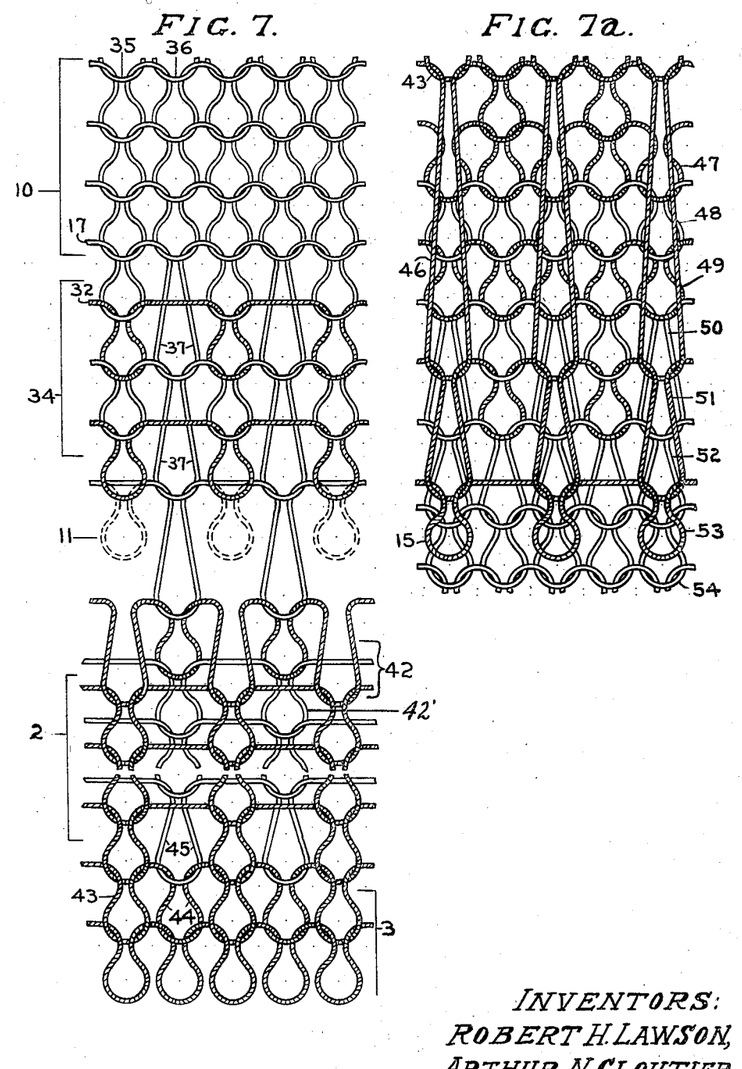
Figs. 7 and 7a are views of the fabric structure at the top of the stocking, the views showing the actual construction of the knitted stitches, and the fabric shown in Fig. 7a being a continuation of the fabric shown in Fig. 7.
Figure 8:
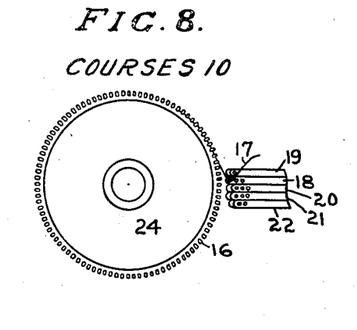
Fig. 8 is a more or less diagrammatic view in plan showing all of the plain or cylinder needles knitting loopers rounds at the main feed station.

A method of knitting the stocking or half hose, disclosed specifically in Figs. 1 and 2 will now be described, attention being directed to the fabric and sequence of operations disclosed in Figs. 7–22 inclusive. When the knitting of the stocking is begun at the top thereof, one or more loopers rounds courses 10 is knitted upon all the cylinder needles 16 as indicated in Fig. 8, all of the cylinder needles 16 knitting a thread or yarn 17 which is fed to such needles by means of a thread or yarn guide 18, the said yarn guide and other yarn guides 19, 20, 21 and 22 being automatically moved to and from thread feeding position by means not herein disclosed as such means does not constitute a necessary part of the present invention. During the knitting of the loopers rounds, the dial needles 23, which are controlled by cams carried on the underside of the cam cap 24, are held in a retracted position where they do not knit. Ordinarily the loopers rounds are knitted with a comparatively loose stitch and to accomplish this purpose the main cam block 25 upon which are mounted the knitting cams 26, 27 and 28, is lowered a short distance thereby causing the cam 26 to impart a greater draft to the cylinder needles which needles are thereby caused to draw relatively loose stitches over the edges of adjacent sinkers 29 (Fig. 15) in the usual manner. A cam 30 is positioned adjacent to the cam block 25 for raising the cylinder needles to a position to be further raised by cam 27.

Figure 9:
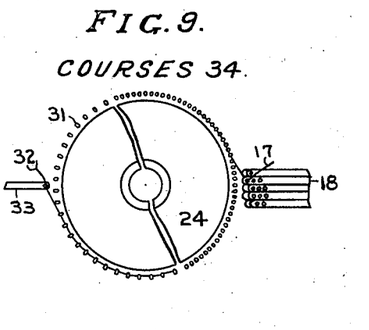
Fig. 9 is a view similar to Fig. 8, but showing all of the cylinder needles knitting at the main feed station and alternate cylinder needles alone knitting at the auxiliary feed station.

Subsequently to the knitting of the loopers rounds, all of the cylinder needles 16 continue to knit the thread or yarn 17 at the main feed station, the alternate cylinder needles designated by the numeral 31 alone knitting a thread or yarn 32 which is fed to the said alternate cylinder needles by means of an auxiliary yarn guide such as 33, which yarn guide may be automatically controlled in any desired manner. The courses thus knitted by the cylinder needles, Fig. 9, are indicated at 34, Fig. 7, wherein wales 35 alternate with other wales 36, the wales 35 consisting of threads 17 and 32 alternately knit in succeeding courses; whereas in the wales 36 is knitted the thread 17 only and during the knitting of alternate courses, the resultant long or draw stitches 37 which are in the wales 36, constituting in conjunction with the wales 35, accordion fabric. During the knitting of such accordion stitches, the auxiliary cam block 38, which carries a stitch drawing cam 39 and center guard cam 40, is held in a relatively raised position, thereby permitting the cylinder needles to draw relatively tight stitches; and the main cam block 25 is raised a short distance so that the cylinder needles may draw shorter stitches as compared with the lengths of stitches drawn during the knitting of the loopers rounds 10. However, the positions of the main and auxiliary cam blocks may be varied and any desired lengths of stitches drawn at the respective cam blocks, if desired. Cams 40′ may be positioned adjacent to the auxiliary cam block 38 for the purpose of selectively raising jacks and thereby their needles. Although the tuck or draw stitches 37 are shown as being nearly twice the length of the adjacent stitches, the stitches as initially drawn are of substantially the same length; but, due to stitch robbing, the draw or tuck stitches 37 are relatively elongated and the adjacent stitches are consequently relatively shortened during the knitting of each course.

Figure 10:
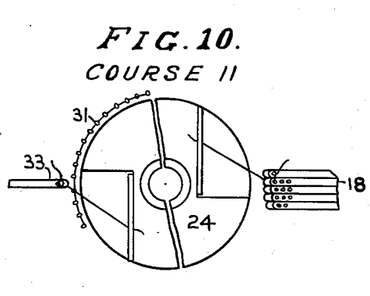
Fig. 10 is a view similar to Figs. 8 and 9 and showing the completion of a pull course, the alternate cylinder needles discontinuing knitting at the main feed station after the drawing of the pull course, Fig. 9, the said alternate cylinder needles then casting off their previously drawn stitches at the auxiliary side of the machine.
Figure 11:
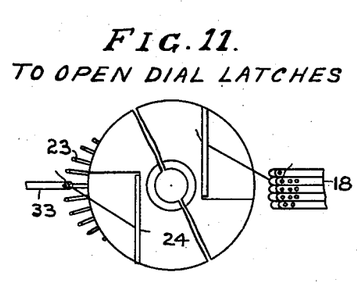
Fig. 11 is still another plan view similar to Fig. 8, the cylinder needles all being inactive and the dial needles being projected to open their latches.

The last accordion course 34 knitted by the cylinder needles at the main feed station has hereinbefore been referred to as the loose course 11, and immediately after the said course 11 has been drawn by the cylinder needles at the main feed station, the yarn lever 18 is elevated to the inoperative position indicated in Fig. 10, whereupon the cylinder needles discontinue knitting at the said main feed station, and upon continued rotation of the needle cylinder, and as indicated in Fig. 10, the alternate cylinder needles 31 are actuated at the auxiliary feed station to cast off their stitches, yarn lever 33 having been elevated to inoperative position. After the course 11 has been drawn by the cylinder needles as just described, the needle cylinder and dial rotate a few revolutions (Fig. 11), during which revolutions a suitable brush (not shown) opens the latches of the dial needles preparatory to the beginning of rib knitting, and during such revolutions the cams 27, 30 and 40' are held in a withdrawn position so as not to cause the stitches to be cast off the inactive cylinder needles. During the aforesaid latch opening revolutions, the guides 18, 33 are in a raised non-feeding position as indicated in Fig. 11.

Although as just described, the alternate needles 31 are cleared of their stitches prior to the opening of their latches; nevertheless, the dial latches may be opened prior to the casting off of the stitches from the said alternate cylinder needles 31.

Ordinarily it is necessary, in order to knit a pull course, to use dial needles, but it has been found that by manipulating the cylinder needles alone to knit accordion and then to discontinue the knitting and cast the stitches off the alternate cylinder needles, a pull course is knitted. In Fig. 7, a pull course 11 is shown, such pull course consisting of stitches knitted on intermediate cylinder needles only although during the knitting of the course the alternate needles as well draw their stitches through the preceding course loops, the said alternate needles subsequently to the drawing of the stitches for the course 11, casting off such stitches thereby permitting the intermediate needles to rob therefrom, such stitches then becoming relatively elongated as shown. In the said Fig. 7, the loops indicated at the alternate wales 35 in dotted lines, represent the length of the stitches throughout the pull course as they are initially drawn by the alternate and intermediate needles.

Figure 12:
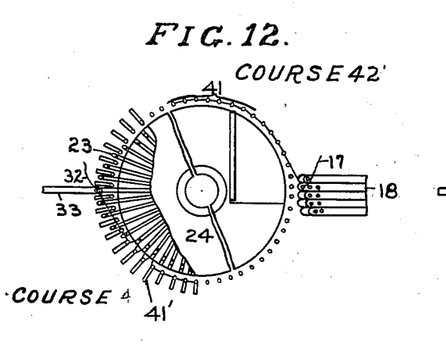
Fig. 12 is a plan view showing the intermediate cylinder needles knitting rib fabric in conjunction with the dial needles at the auxiliary feed station, and also showing the intermediate cylinder needles knitting at the main feed station, some of the adjacent long and short butts being indicated.
Figure 13:
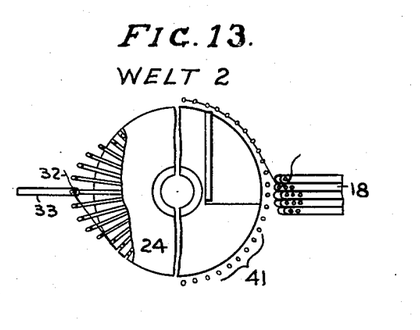
Fig. 13 is a plan view showing the dial needles alone knitting at the auxiliary feed station, and showing the intermediate cylinder needles alone knitting at the main feed station.

Upon the completion of the pull course or courses 11, and the opening of the latches in the manner described, the top or selvage course of the next stocking is knitted in the manner indicated in Fig. 12. The intermediate cylinder needles 41, commencing with the first long butt instep needle indicated by the numeral 41', knit one selvage course 42 of rib with the yarn 32 at the auxiliary side in conjunction with the dial needles, continued rotation of the needle cylinder and dial causing the intermediate cylinder needles 41 to knit a selvage course 42' with the thread 17 at the main feed station. Immediately thereafter (Fig. 13), i. e., during the same revolution of the needle cylinder and dial, such intermediate cylinder needles 41 discontinue knitting at the auxiliary feed station, although the dial needles 23 continue to knit at the said auxiliary station, the result being the knitting of a French welt. Throughout the knitting of the French welt, the intermediate cylinder needles 41 knit normal length stitches at the main feed station, the main cam block 25 being held at an intermediate level, and the jack cams 40' at the auxiliary feed station being maintained in a retracted position so as not to actuate the cylinder needles.

Rib

Figure 14:
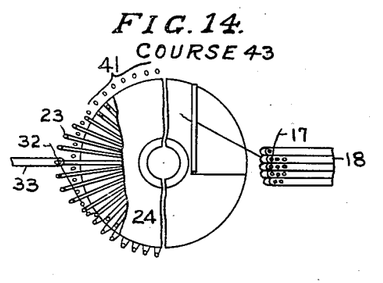
Fig. 14 is a plan view similar to Fig. 13 but showing the knitting as being discontinued at the main feed station, the intermediate cylinder needles immediately thereafter, i. e., during the same course or revolution, joining the dial needles and thereafter knitting rib fabric at the auxiliary feed station.

At the completion of the knitting of the French welt 2, the cams 27 and 30 are retracted, the intermediate cylinder needles 41 (Fig. 14) consequently discontinuing knitting at the main feed station, the thread guide 18 being elevated as the cam 30 is withdrawn. Continued rotation of the needle cylinder and dial causes the intermediate cylinder needles 41, when they reach the auxiliary feed station, to be raised by a jack cam 40' which in the meantime has been restored to a position adjacent to the needle cylinder. The dial needles 23 continue to knit and in conjunction with the intermediate cylinder needles 41, the dial needles drawing the loops or stitches of courses 43 through previously knitted loops while the intermediate cylinder needles 41 draw loops 44 through loops 45 previously knitted with the thread 17 at the main feed station. Thereafter the dial needles 23 and intermediate cylinder needles 41 continue to knit one and one or other rib fabric 3 at the auxiliary feed station, but do not knit at the main feed station, the cams 27 and 30 thereat being maintained in a withdrawn position and the thread guide 17 being maintained in an elevated, inoperative position throughout the knitting of such rib courses 3, Fig. 7. When knitting is discontinued at the main feed station, the cam block 25 is elevated so as to permit the butts of the cylinder needles to pass beneath the same; otherwise engagement of the cylinder needle butts by the cam 26 would tend to break the stitches. Prior to the knitting of the first course by the alternate cylinder needles 31 at the auxiliary feed station, it is desirable that the auxiliary cam block 38 be elevated to a relatively high level so that the intermediate cylinder needles 41 may thereafter draw the proper length of stitch and over the shanks of the adjacent or companion dial needles 23 which are positioned at a level above that of the upper edges of the sinkers 29 over the upper edges of which the cylinder needles draw plain stitches, i. e., when they are not knitting rib in conjunction with the dial needles.

Transfer

Figure 15:
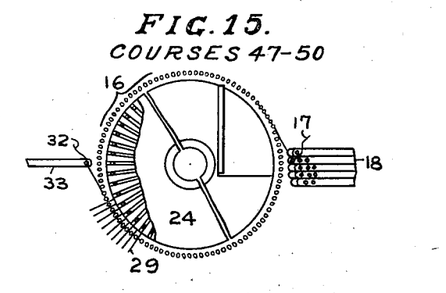
Fig. 15 is a plan view showing all of the cylinder needles alone knitting at the auxiliary feed station and over the nibs of interspersed sinkers, the said cylinder needles alone knitting in the usual manner at the main feed station.
Figure 15A:
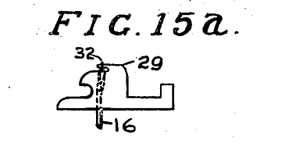
Fig. 15a is a detail corresponding to Fig. 15 and showing a sinker cooperating with an adjacent needle.

The change from rib knitting to plain knitting, i. e., the transfer of rib stitches to plain stitches, is effected in the following manner reference being had to Fig. 7a:

The dial needles 23 discontinue knitting at the auxiliary feed station (Fig. 15), the said dial needles retaining their stitches until several courses have been knitted by all of the cylinder needles alone, the held stitches being elongated as shown at 46 and spanning the loops or stitches of courses 47, 48, 49, 50 knitted in a manner hereinafter to be described. The elongation of the held stitches is due to the fact that the said dial needles, which retain their stitches while the cylinder needles are knitting several courses as aforesaid, rob from adjacent cylinder wales, and as a consequence thereof the resultant fabric structure differs from that shown in Fig. 7 in that rib stitches, while not so long as shown in said Fig. 7, are longer than other stitches, and the adjacent cylinder stitches are shorter than as shown in Fig. 7a. All of the cylinder needles 16 are, simultaneously with the withdrawal of the dial needles, caused to take thread, such as thread 32, and thereafter knit at the auxiliary feed station as well as at the main feed station for two revolutions of the needle cylinder, the said cylinder needles during the knitting of such courses drawing their stitches over the tops of the sinkers 29 as shown in Figs. 15 and 15a. The four courses knitted at the auxiliary and main feed stations by all of the cylinder needles 16 as just described are indicated in Fig. 7a by the numerals 47, 48, 49 and 50, the courses 47 and 49 being knitted at the auxiliary side while the courses 48 and 50 are being knitted at the regular side. As the first of the cylinder needles with the stitches of the courses 46 thereon approach the cam block at the main side of the machine, the said cam block is gradually lowered until it is at the normal level, the lowering being completed after a few stitches have been knitted at the main feed station.

Figure 16:
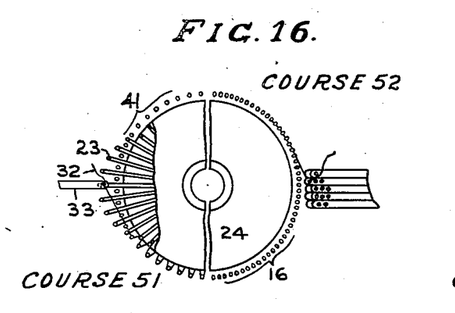
Fig. 16 is a plan view showing the intermediate cylinder needles and the dial needles knitting at the auxiliary feed station, and all of the cylinder needles knitting at the main feed station.

Thereafter, the intermediate cylinder needles 41 (Fig. 16) and the dial needles 23 knit one rib course 51 at the auxiliary side and during the same revolution of the needle cylinder all of the cylinder needles 16 alone knit a plain course 52 at the main feed station.

Figure 17:
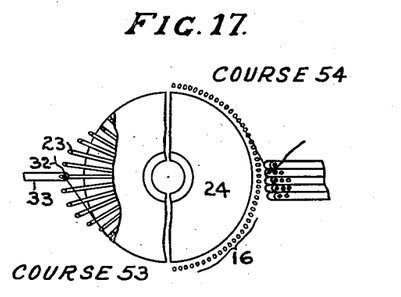
Fig. 17 is a plan view showing the dial needles alone knitting at the auxiliary feed station, and all of the cylinder needles knitting at the main feed station.
Figure 18:
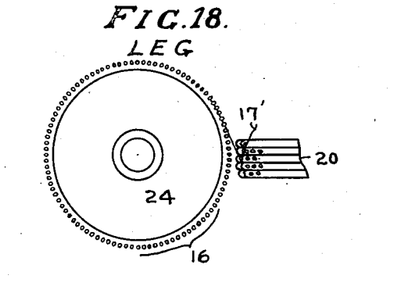
Fig. 18 is a plan view showing all the cylinder needles knitting plain fabric at the main feed station, knitting being discontinued at the auxiliary feed station.
Figure 19:
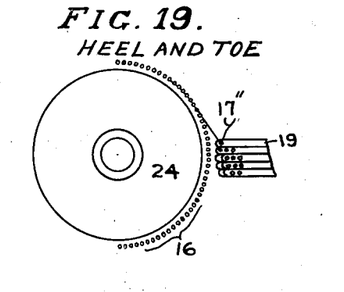
Fig. 19 is a plan view showing half, more or less, of the cylinder needles knitting in reciprocating manner, e. g. knitting heels and toes of stockings.
Figure 20:
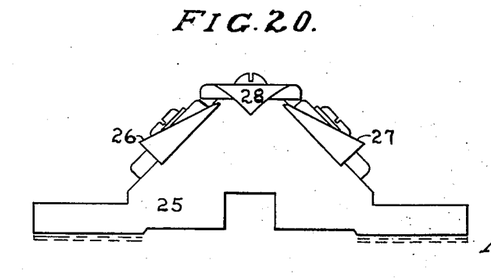
Fig. 20 is a view in vertical elevation showing the cam block and cams for controlling cylinder needles at the main feed station.
Figure 21:
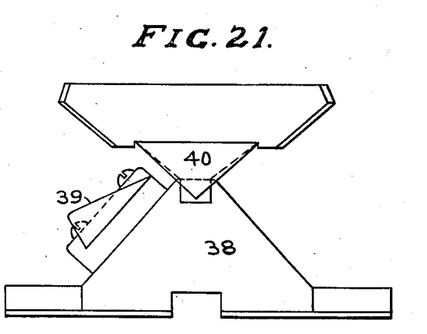
Fig. 21 is a view similar to Fig. 20 and showing the corresponding cam block at the auxiliary feed station.
Figure 22:
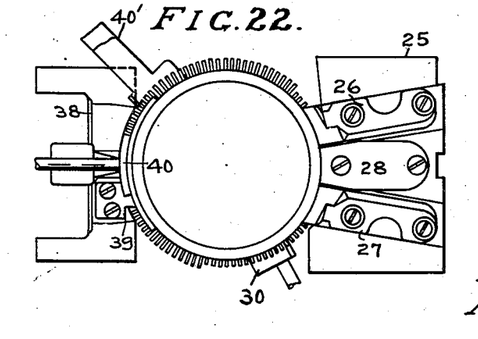
Fig. 22 is a plan view showing the main and auxiliary cam blocks in their relative positions with respect to the needle cylinder.

Thereafter, the dial needles continue to knit (Fig. 17) at the auxiliary side for one or more courses 53 to provide a tab or extension 15, after which the dial needles are actuated to cast off their stitches and then withdrawn to an idle position (Fig. 18); all of the cylinder needles knitting courses 54 with a thread 17', such courses 54 constituting the plain leg 4 of the stocking or other fabric. Following the knitting of the leg and foot of a stocking, a heel 5 and toe 7 respectively are knitted by half of the cylinder needles knitting a thread 17" and in a reciprocating manner as indicated in Fig. 19.

In Figs. 23–32 inclusive, is shown a modified form of transfer, method of and mechanism for effecting the same.

Figure 23:
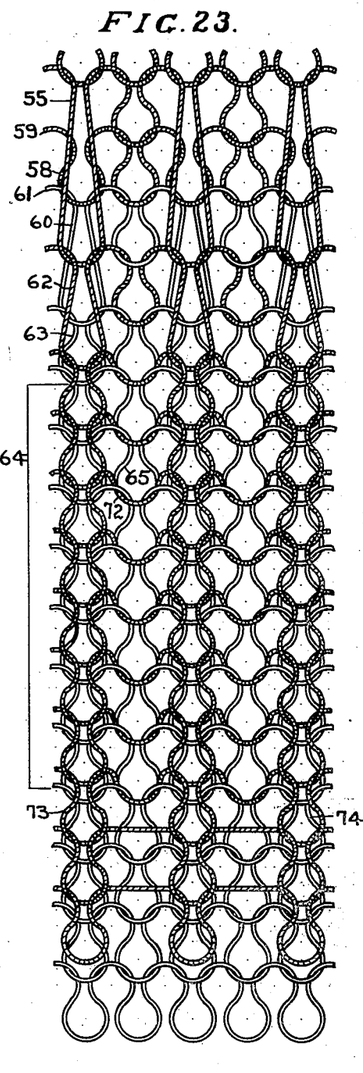
Fig. 23 is a view showing a modified fabric structure, and especially showing how transfer from rib to plain fabric is effected.
Figure 24:
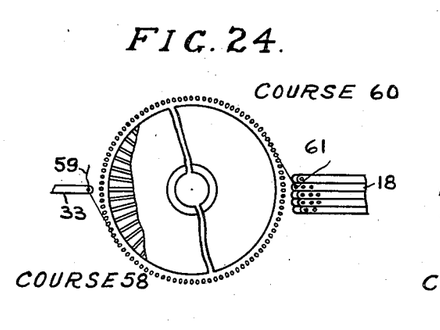
Fig. 24 is a diagrammatic plan view showing all the cylinder needles knitting at both the regular and auxiliary sides of the machine.

Referring first to Fig. 23 which shows the fabric, 55 designates the last rib course knitted on the dial and intermediate cylinder needles at the auxiliary side of the machine in a manner hereinbefore described. Immediately following the drawing of the last rib course 55 by the dial needles 56 and intermediate cylinder needles 57, the dial needles hold their loops during the knitting of two courses without taking yarn for new courses or casting the old loops off their latches; and during the knitting of the said two courses all of the cylinder needles including the theretofore inactive cylinder needles knit, first, one course 58 with the thread 59 at the auxiliary side of the machine, and thereafter during the same revolution of the needle cylinder, the said cylinder needles knit one course 60 at the main side and with the thread 61, the knitting of the courses 58, 60 being indicated in Fig. 24.

Figure 25:
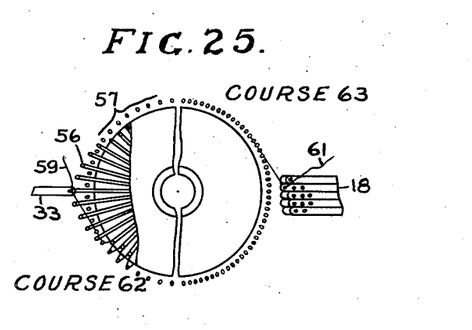
Fig. 25 is a view similar to Fig. 24 but showing the dial needles and intermediate cylinder needles knitting one or more courses of one and one rib fabric at the auxiliary feed station, and showing all of the cylinder needles knitting one or more plain courses at the main feed station.

As the needle cylinder continues to rotate, the course 62 is knitted at the auxiliary side by the dial needles 56 and intermediate cylinder needles 57 drawing loops of the thread 59 and casting off the old stitches, i. e., the dial needles casting off the stitches previously drawn with the thread 59 and the intermediate cylinder needles 57 casting off the stitches drawn at the main or regular side of the machine with the thread 61. The knitting of the course 62 is indicated at the left of Fig. 25. Simultaneously with the knitting of the course 62 at the auxiliary side, i. e., during the same revolution of the needle cylinder, a plain course 63 is knitted by all of the cylinder needles knitting the thread 61, the knitting of such course being indicated at the right-hand portion of Fig. 25.

Figure 26:
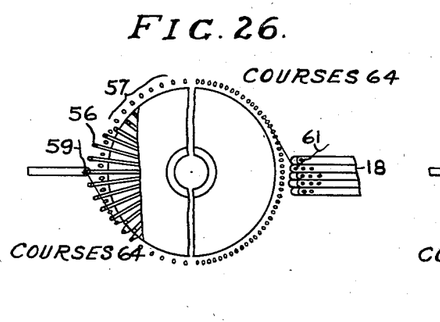
Fig. 26 is a plan view showing the yarn being fed into the hooks of intermediate cylinder needles at the auxiliary feed station, such yarn not being cast off the latches of said intermediate cylinder needles until they knit at the main feed station where all of the cylinder needles knit.
Figure 27:
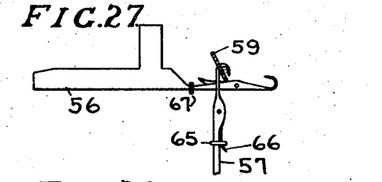
Figs. 27–30 inclusive are detail views showing the knitting of anti-run courses on the dial and cylinder needles.
Figures 28, 29:
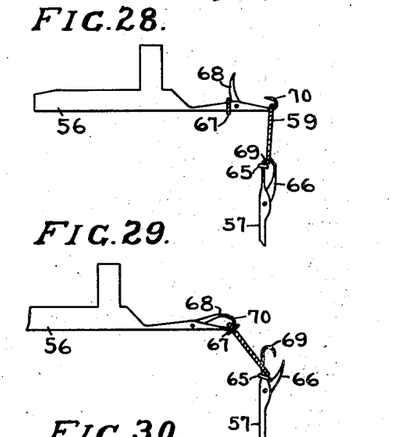
Figure 30:
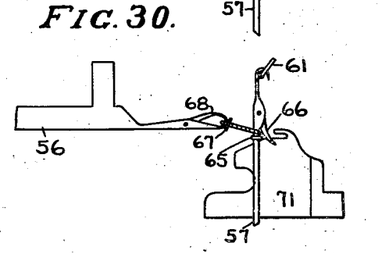
Figure 31:
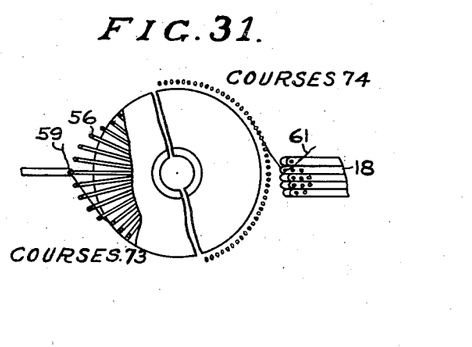
Fig. 31 is a plan view showing the dial needles knitting plain fabric at the auxiliary feed station and all of the cylinder needles knitting plain fabric at the main feed station.
Figure 32:
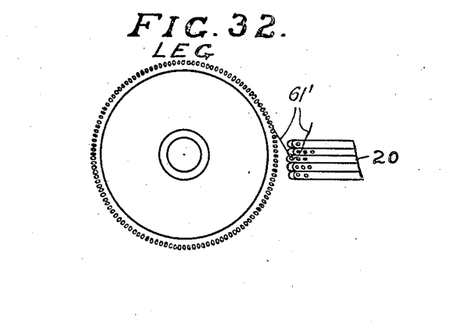
Fig. 32 is a plan view showing all of the cylinder needles knitting plain fabric at the main feed station, the dial needles having cast off their stitches.

As indicated in Fig. 26, all of the cylinder needles continue to knit plain fabric with the thread 61 at the main side of the machine; while, following the knitting of the course 62, the thread 59 is knitted by the dial needles at the auxiliary side and cast off at that side only, said thread 59 being engaged in the hooks of the intermediate cylinder needles 57, all in a manner hereinafter to be described. The anti-ravel courses 64 knitted in the manner indicated in Fig. 26, are knitted by the dial needles 56 and the intermediate cylinder needles 57 cooperating in the manner indicated in Figs. 27–30 inclusive. In Fig. 27 a cylinder needle 57 is shown as having a loop 65 of a course 64 surrounding the needle shank and latch 66. In Fig. 28 a dial needle is shown as being retracted and with a loop 67 of the stitch drawn during the knitting of the previous course, the said loop or stitch 67 being shown in the act of closing the dial latch 68; Fig. 28 also shows the cylinder needle 57 in its lowermost position with the stitch or loop 65 within the hook 69 of the needle. Fig. 29 shows the dial needle as having moved to its innermost position and the old stitch 67 as having been cast off over the hook 70 of the needle and the newly drawn loop as being within the hook of the needle. Fig. 29 also shows the cylinder needle 57 beginning to rise. Fig. 30 shows the dial needle in the position shown in Fig. 29; but shows the cylinder needle 57 in an upper position and with a new bight or loop of yarn 61 in its hook preparatory to drawing a new stitch; while below the latch 66 is shown the stitch 65 as well as the stitch drawn with the thread 59 while the cylinder needle was moving from the position shown in Fig. 27 to that shown in Fig. 28. In Fig. 30 is also shown a portion of a sinker 71 over which the cylinder needle 57 draws its stitch. The net results of the operations diagrammatically disclosed in Figs. 27, 28, 29 and 30 are: the loops or stitches of the thread 59 drawn by the cylinder needles 57, are not drawn through previously knitted loops and as a consequence thereof the said stitches are cast off with stitches such as 65 formed by drawing loops with the thread 61. A stitch 65 is shown in Fig. 23 and is cast off over a needle 57 with the non-knitted or tuck stitch provided by the failure to cast off the stitch drawn with the thread 59, the latter stitch being indicated at 72.

At the conclusion of the knitting of a desired number of anti-run courses 64, the dial needles (Fig. 31) knit the thread 59 at the auxiliary side of the machine and do not knit or cast off at the main side; likewise all of the cylinder needles knit the thread 61 at the main side but do not knit at the auxiliary side. Consequently the dial needles knit plain courses 73 while the cylinder needles knit other plain courses 74.

After the knitting of a few courses 73 on the dial needles, the said needles cast off their stitches; while the cylinder needles (Fig. 32) knit the thread 61 or another thread 61' at the main feed station, a plain leg, i. e., without rib stitches resulting, although the leg of the stocking may be ornamented in any desired manner, if desired.

The hereinbefore described methods of knitting, produce fabrics having selvage edges that do not curl or roll.

Some of the stitches of the selvage course, Fig. 7, are first-course loops or stitches drawn by the alternate needles 31, while the other stitches are drawn through loops or stitches knitted on the intermediate cylinder needles 41 during the knitting of the preceding course.

The alternate and intermediate cylinder needles are respectively controlled at the auxiliary feed station by means of two cams 40' which raise jacks which are located in the tricks of the needle cylinder and beneath the needles.

Although in the foregoing description, several thread guides are disclosed one of which is shown as feeding a thread to the needles throughout the knitting of a portion of the stocking or half hose, and other thread guides are shown as feeding threads to the needles during the knitting of other portions of the stocking or half hose; the said threads are interchangeable in that any one is adapted to be fed to the needles during the knitting of any portion of the stocking or half hose.

The fabric disclosed in Fig. 23, can be knitted by causing the cylinder needles 57 to draw their stitches over the shanks of the dial needles 56 in the manner indicated in Figs. 27, 28 and 29; but instead of causing the cylinder needles other than the needles 57 to draw the yarn 61, at the main feed station, over the edges of the sinkers 71 forward of the nibs thereof, the said sinkers 71 may be advanced earlier in the knitting cycle thereby causing the said cylinder needles, as they descend, to draw their stitches over the nibs of the sinkers in the manner indicated in Fig. 15a.

The operations of the needles and sinkers in a manner just described, permits the transfer from rib fabric to plain fabric to be effected by causing the cylinder needles 57 to draw their stitches over the shanks of the dial needles 56 at the auxiliary feed station, and when arriving at the main feed station, permitting the other cylinder needles to draw their stitches over the nibs of the sinkers 71. The edges of the dial needles over which the yarns are drawn at the auxiliary feed station by the needles 57 are located at a level a short distance only above the level defined by the upper edges of the nibs of the sinkers 71, and as a consequence thereof, the cylinder needles other than the needles 57 draw their stitches at an earlier time in the knitting cycle than they otherwise would and over the edges of the nibs of the sinkers; otherwise when the said cylinder needles, i. e., the ones other than the needles 57, draw their stitches over the upper edges of the sinkers in a normal manner, they cast off their stitches later in the knitting cycle than do their immediately following and adjacent needles 57, the result being that the subsequent stitch drawing and casting off movement of the cylinder needles other than the needles 57, imposes such a drag on the yarn that there is a tendency to rupture the same.

Subsequently to the knitting of the courses 64 in the manner just described, plain fabric is knitted by all of the cylinder needles knitting at the main feed station and over the edges of sinkers in the usual manner, i. e., over the edges forwardly of the nibs or over the edges at the backs thereof. Thus the plain wales of the fabric shown in Fig. 23 may be knitted by cylinder needles knitting at three levels, namely, by the cylinder needles 57 drawing their stitches over the shanks of dial needles at a relatively high level; by the cylinder needles other than the needles 57 thereafter drawing their stitches over the nibs of sinkers 71 at a level a little below the level first mentioned; by the cylinder needles drawing their stitches over sinkers in the usual manner, i. e., over the edges of the sinkers forwardly of the nibs or over the edges at the backs of the said nibs, the level last mentioned being a short distance below the level second mentioned.

One important result obtained from the method of transfer hereinbefore described, is that any strain or tension exerted on the stitches of the fabric, either during knitting or subsequently thereto, imposes no direct strain on the discontinued rib stitches, i. e., the ones included in the tab 15 and as a consequence thereof there is no tendency for the wales constituting the tab to run.

Another important result obtained by the methods hereinbefore described, is due to the fact that, when knitting a French or turned welt, the plain stitches are cast off by the sinkers and may be somewhat looser than would be the case if a take-up were depended upon to cast the stitches off the needles. When a take-up is utilized for tensioning the two sets of wales constituting a French welt, the wales knitted by the dial needles are properly tensioned by the take-up and the dial needles cast the stitches off without difficulty; but on the other hand, the cylinder needles being more or less in line with the lines of force exerted by the take-up on the fabric, the tension exerted by such take-up is not so pronounced on the cylinder wales as it is on the wales knitted by the dial needles, and as a consequence thereof, if it be attempted to knit relatively loose stitches on the cylinder needles, difficulty is experienced in properly casting the stitches off the cylinder needles. However, the use of sinkers, permits the cylinder needles to draw much longer stitches than would otherwise be possible because of the fact that the take-up tension is not availed of to cause the cylinder needles to cast off their stitches, the casting off being the result of the normal operation of the sinkers; and furthermore, when inturned welts are knitted by the cylinder needles alone knitting, the cylinder needles likewise may draw longer stitches than would otherwise be possible, the sinkers operating as just stated to cast the stitches off such cylinder needles, the longer stitches drawn by the cylinder needles obviously permitting the dial needles likewise to draw longer stitches.

The obvious result of knitting in the manner just described, is that French or turned welts may be knitted looser and as a consequence thereof the stocking top will have more stretch.

Wherever in the claims alternate and intermediate needles are referred to, there is no intention thereby of limiting the claims to one and one alternation; in other words, one or more needles of one description may alternate with one or more needles of another description.

Although in the foregoing description, the parts and combinations thereof have been described in specific terms, nevertheless there is no intention thereby to limit the invention otherwise than as called for by the specific recitations in the claims themselves.

We claim:

1. A fabric consisting of adjoining rib and plain courses, the rib courses and plain courses being connected by transfer courses, such transfer courses including plain courses and rib wales superposed on plain wales of the plain courses.

2. A fabric consisting of adjoining rib and plain courses, the rib courses and plain courses being connected by transfer courses, such transfer courses including plain courses and rib wales superposed on plain wales of the plain courses, such superposed rib wales including stitches spanning a plurality of stitches in the plain wales.

3. A fabric consisting of adjoining rib and plain courses, the rib courses and plain courses being connected by transfer courses, such transfer courses including plain courses and rib wales superposed on plain wales of the plain courses, such superposed rib wales including stitches spanning a plurality of stitches in the plain wales and such rib stitches being joined to the plain stitches in a rib course.

4. A fabric consisting of adjoining rib and plain courses, the rib courses and plain courses being connected by transfer courses, such transfer courses including plain courses and rib wales superposed on plain wales of the plain courses, such superposed rib wales including stitches spanning a plurality of stitches in the plain wales and such rib stitches being joined to the plain stitches in a rib course, one such rib course terminating in two separated, plain fabrics.

5. A selvage fabric, the selvage course whereof is composed of alternating rib and plain stitches, transfer courses adjacent to the selvage course and consisting of plain stitches on one face of the fabric and rib stitches on the other face thereof, the last named plain and rib stitches merging in a uniting course, and other courses knitted with two threads, one such thread forming plain stitches and the other forming rib stitches.

6. A fabric consisting of adjoining rib and plain courses, the rib and plain courses having the same number of wales, alternate plain wales and the rib wales being continuations, the one of the other, rib stitches being superposed over plain wales adjacent to the junction of the plain and rib courses.

7. In a method of effecting a transfer to plain fabric from rib fabric, a step which consists in drawing one course of stitches over the shanks of dial needles and drawing the next course of stitches over the nibs of sinkers.

8. In a method of knitting adjoining rib and plain courses and for effecting a transfer from one to the other, which consists in drawing one course of stitches over instrumentalities positioned at one level and in drawing the next course of stitches over instrumentalities at another level, the two levels being closely adjacent.

9. A method of knitting transfer courses, such method consisting in drawing stitches knitted with one yarn at one level and drawing stitches knitted with another yarn and immediately thereafter at a lower and closely adjacent level and finally drawing the stitches at a still lower level closely adjacent to the level second mentioned.

10. A method of knitting a French welt consisting in knitting the plain wales over sinkers, whereby the stitches thus knitted may be loose stitches.

11. A method of knitting courses for the purpose of effecting transfer from rib fabric to plain fabric, said method consisting in knitting one thread with all of one series of needles and knitting another thread with some at least of the other series of needles and, during knitting, connecting the two threads at some only of the wales.

12. A method of knitting as set forth in claim 11 and wherein the connecting of the two threads is effected by causing the second thread to be interknitted with the first thread.

13. A method of knitting as set forth in claim 11 and wherein the connecting of the two threads is effected by causing the first thread to be drawn through the second thread at some at least of the wales but without causing the second thread to be drawn through the first thread at such wales.

14. A method of knitting a pull course on plain needles only, such method consisting in knitting plain fabric on plain needles only of a knitting machine, continuing the knitting on alternate plain needles and casting the stitches off intermediate plain needles which are interspersed among the said alternate plain needles so that a course is made which may be pulled out thereby separating the mentioned plain courses from the fabric knitted subsequently to the knitting of the pull course.

15. A method of knitting a selvage fabric consisting of knitting on plain needles only of a knitting machine and thereafter discontinuing knitting on some of the needles which are interspersed among the remaining plain needles so that a pull course is made and subsequently to the making of the pull course, knitting selvage, rib fabric on some of the plain needles and on rib needles of the knitting machine.

16. A method of knitting a selvage fabric consisting in knitting on all of the plain needles only of a knitting machine and thereafter discontinuing knitting on some of the plain needles which are interspersed among the remaining plain needles so that a pull course is made and subsequently to the making of the pull course, knitting a selvage fabric.

ROBERT H. LAWSON.
ARTHUR N. CLOUTIER.